United States Patent
Nasre et al.

(10) Patent No.: US 8,086,603 B2
(45) Date of Patent: *Dec. 27, 2011

(54) USING LUN TYPE FOR STORAGE ALLOCATION

(75) Inventors: Rupesh Nasre, Bangalore (IN); Mahanteshwar Chimangala Maheshwar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,470

(22) Filed: Feb. 7, 2011

(65) Prior Publication Data

US 2011/0125797 A1    May 26, 2011

Related U.S. Application Data

(63) Continuation of application No. 11/963,557, filed on Dec. 21, 2007, now Pat. No. 7,890,504.

(51) Int. Cl.
*G06F 17/30* (2006.01)
(52) U.S. Cl. ....................................................... 707/729
(58) Field of Classification Search .................. 707/729, 707/999.205
See application file for complete search history.

(56) References Cited

U.S. PATENT DOCUMENTS

| | | | |
|---|---|---|---|
| 5,897,661 A * | 4/1999 | Baranovsky et al. | 711/170 |
| 6,678,788 B1 | 1/2004 | O'Connell | |
| 6,691,209 B1 | 2/2004 | O'Connell | |
| 7,721,292 B2 * | 5/2010 | Frasier et al. | 718/104 |
| 7,890,504 B2 | 2/2011 | Nasre et al. | |
| 2004/0030668 A1 | 2/2004 | Pawlowski et al. | |
| 2004/0225855 A1 | 11/2004 | Branch | |
| 2005/0246382 A1 * | 11/2005 | Edwards | 707/200 |
| 2006/0085598 A1 | 4/2006 | Nemoto et al. | |
| 2006/0136761 A1 | 6/2006 | Frasier et al. | |
| 2007/0022314 A1 | 1/2007 | Erasani et al. | |
| 2007/0061454 A1 | 3/2007 | Lee et al. | |

OTHER PUBLICATIONS

International Search Report for International Application No. PCT/US2008/086706 mailed Jun. 25, 2009 from the Korean Intellectual Property Office, Government Complex-Daejeon, 139 Seonsa-ro, Seo-gu, Daejeon 302-701, Republic of Korea, 11 pages.
Frank Schmuck, et al., A shared disk file system for large computing clusters, Jan. 2002, 14 pages.
Co-Pending U.S. Appl. No. 11/983,557, filed Dec. 21, 2007 (issuing as U.S. Patent No. 7,890,604 on Feb. 15, 2011).
Notice of Allowance Mailed Dec. 7, 2010 in Co-Pending U.S. Appl. No. 11/963,557, filed Dec. 21, 2007.
Final Office Action Mailed Sep. 16, 2010 in Co-Pending U.S. Appl. No. 11/963,557, filed Dec. 21, 2007.
Non-Final Office Action Mailed Mar. 15, 2010 in Co-Pending U.S. Appl. No. 11/963,557, filed Dec. 21, 2007.

* cited by examiner

*Primary Examiner* — John R. Cottingham
*Assistant Examiner* — Noosha Arjomandi
(74) *Attorney, Agent, or Firm* — Perkins Coie LLP

(57) ABSTRACT

In an embodiment of the invention, an apparatus uses a LUN (logical unit number) data type for storage allocation. The apparatus includes a storage appliance that specifies a LUN data type for a LUN. The storage appliance then allocates data blocks in the LUN based on the LUN data type. The storage appliance allocates data blocks in the LUN as contiguous data blocks or as non-contiguous data blocks, based on the LUN data type. The LUN data type may be, for example, database data type, user data type, or binary data type.

23 Claims, 6 Drawing Sheets

←—400

| LUN type (i.e., data type) | Examples. | Properties. | Contigous blocks? | Large number of blocks? | Fixed size? |
|---|---|---|---|---|---|
| Binary-type. (405) | Executables, audio, video, cd images | No changes. | Yes. | No. | Yes. |
| Database-type. (410) | Emails, Oracle, Sybase | Changes to data depending on application using the database. Typically large changes. | No. | Yes. | No. |
| User data type. (415) | Home directory, user documents. | Slow and small changes to data. | Yes. | No. | No. |
| Other data type. (420) | | | | | |

FIG. 4

USING LUN TYPE FOR STORAGE ALLOCATION

This is a continuation of U.S. patent application Ser. No. 11/963,557, filed on Dec. 21, 2007 (issuing as U.S. Pat. No. 7,890,504 on Feb. 15, 2011), which is incorporated herein by reference.

TECHNICAL FIELD

Embodiments of the invention relate generally to an apparatus and method for using the LUN (logical unit number) type for storage allocation.

BACKGROUND

In storage technology, a storage appliance is one type of computer that provides services relating to the organization and storage of information or data on storage devices such as, for example, disk drives ("disks"). In other words, a storage appliance is adapted to store and retrieve data on behalf of one or more client processing systems ("clients" or "hosts") in response to external requests received from the hosts. A storage appliance can provide clients with file-level access to data stored in the storage devices. A storage appliance can also provide clients with block-level access to stored data, or with both file-level access and block-level access. For convenience, a storage appliance will be described herein, for the most part, in terms of the former, though the description herein will have application to the latter types of storage appliances as well, as will be apparent to those of ordinary skill in the art in light of the description that follows. Examples of such storage appliances include, but are not limited to, a file server or another type of computing device that provides storage services using a file system to respond to file-oriented data access requests ("filer"). A storage appliance includes a storage operating system that implements the file system to logically organize the information as a hierarchical structure of directories and files on the disks. Each file on a disk may be implemented as a set of data structures, e.g., disk blocks, which are configured to store information. A directory may be implemented as a formatted file in which information by other files and directories is stored.

An implemented disk storage for a storage appliance typically has one or more storage "volumes" which are a collection of physical storage disks and which define an overall logical arrangement of storage space. In other words, a storage volume is a logical container that includes a collection of disks. Therefore, the collection of disks is grouped (assimilated) into the storage volume. Each storage volume is generally associated with a file system.

One or more host computers (hosts) can share the storage resources (e.g., storage space) of storage appliances in a network. The process of allocating the storage space to a host is known as "storage provisioning". The host can access and use the storage space that has been allocated to the host. The same storage space can be allocated to different hosts, and as a result, the different hosts can use the same storage space. Different storage space can also be allocated to different hosts, so that each host is allocated with a unique storage space.

When the disks in a LUN (logical unit number) is allocated to one or more hosts, the RAID (Redundant Array of Independent or Inexpensive Disks systems) level and the operating system (OS) type is specified for the LUN. LUNs are discussed in additional details below. The RAID level indicates the RAID format of the data that is stored in the LUN (e.g., the data may be formatted as, for example, striped data or concatenated data). Details of the RAID technology are well-known to those skilled in the art and are disclosed in, for example, "A Case for Redundant Arrays of Inexpensive Disks (RAID)", by D. A. Patterson, et al., Proceedings of the International Conference on Management of Data (SIG-MOD), June 1988. The OS type would indicate the operating system type (e.g., Solaris, WINDOWS, HP-UX, AIX, LINUX, IMAGE, etc.) of a host computer that would be accessing the LUN. As known to those skilled in the art, the OS type will determine the LUN format and data format in the LUN (e.g., the LUN geometry, prefix, and suffix) that are compatible for the OS type that will access the LUN. The RAID level and the OS type are specified for a LUN by use of attributes in data structures in the LUN.

However, current methods for writing data into the storage spaces can, in turn, lead to inefficient read operations when reading data from the storage spaces, particularly as the sizes of data being written generally continue to increase. Therefore, the current technology is limited in its capabilities and suffers from at least the above constraints and deficiencies

SUMMARY OF EMBODIMENTS OF THE INVENTION

In an embodiment of the invention, an apparatus uses a LUN (logical unit number) data type for storage allocation. The apparatus includes a storage appliance that specifies a LUN data type for a LUN. The storage appliance then allocates data blocks in the LUN based on the LUN data type. The storage appliance allocates data blocks in the LUN as contiguous data blocks or as non-contiguous data blocks, based on the LUN data type. The LUN data type may be, for example, database data type, user data type, or binary data type, as discussed in further details below.

By specifying the LUN data type for a LUN, a file system of the storage appliance can allocate data blocks for the LUN in a more intelligent manner, by allocating a larger number of data blocks for database data types and allocating contiguous data blocks for binary data types and user data types. By allocating a larger number of data blocks for database data types, the performance of the storage appliance improves because sufficient storage space will be available for the large data sizes of the database data type. By allocating contiguous data blocks for binary data types and user data types, the performance of the storage appliance improves because read operations will increase in speed when reading a binary data type or user data type because the data in the contiguous data blocks are prefetched.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a table diagram that summarizes various characteristics of different data types that can be stored in a LUN as used in an embodiment of the invention.

DETAILED DESCRIPTION OF PREFERRED EMBODIMENTS

Figure 1:
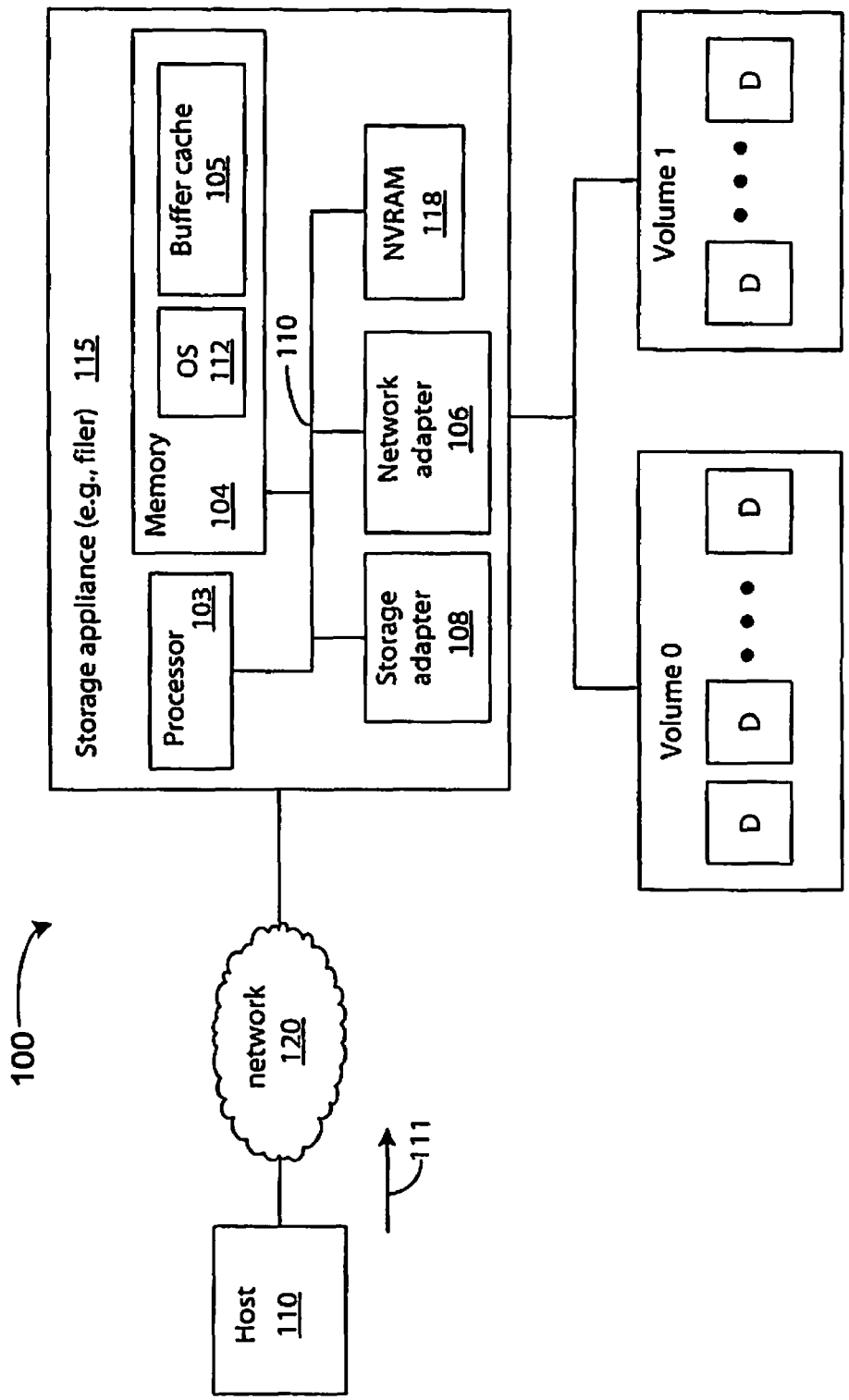
FIG. 1 is a block diagram of a system (apparatus), in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

In an embodiment of the invention, an apparatus uses a LUN (logical unit number) data type for storage allocation. The apparatus includes a storage appliance that specifies a LUN data type for a LUN. The storage appliance then allocates data blocks in the LUN based on the LUN data type. The storage appliance allocates data blocks in the LUN as contiguous data blocks or as non-contiguous data blocks, based on the LUN data type. The LUN data type may be, for example, database data type, user data type, or binary data type, as discussed in further details below.

By specifying the LUN data type for a LUN, a file system of the storage appliance can allocate data blocks for the LUN in a more intelligent manner, by allocating a larger number of data blocks for database data types and allocating contiguous data blocks for binary data types and user data types. By allocating a larger number of data blocks for database data types, the performance of the storage appliance improves because sufficient storage space will be available for the large data sizes of the database data type. By allocating contiguous data blocks for binary data types and user data types, the performance of the storage appliance improves because read operations will increase in speed when reading a binary data type or user data type because the data in the contiguous data blocks are prefetched. Therefore, an embodiment of the invention will allocate the data blocks based on the LUN data type, and this method of allocation results in optimized reads and optimized writes.

The SAN (storage area network) clients typically identify and address the stored information (in storage devices associated with a storage appliance) in the form of blocks or disks by logical unit numbers ("LUNs"). Clients of a NAS-based (networked attached storage) network environment have a storage viewpoint of files. Clients of a SAN-based network environment have a storage viewpoint of blocks or disks. To that end, a storage appliance presents (exports) disks to SAN clients through the creation of LUNs or vdisk objects. Therefore, the vdisks objects are accessible as LUNs from the SAN (FC (fiber channel) and SCSI (Small Computer System Interface)) protocols. Therefore, a LUN can generally be viewed in concept as a logical unit of storage that is carved out of volumes. As an example configuration, a volume size can be three times of the size of a LUN (e.g., 3-terabyte volume versus 1-terabyte LUN). A vdisk object is a special file type that derives from a plain (regular) file, but has associated export controls and operation restrictions that support emulation of a disk. A vdisk object is translated into an emulated disk as viewed by the SAN clients. A vdisk is formed by an allocating a pool of blocks from a set of disks or portions (e.g., extents) of disks. A vdisk object is a multi-node object that includes a special file inode that holds (or points to) data and at least one associated stream inode that holds attributes such as security information. Clients may access vdisks stored on the storage appliance by utilizing a block-based protocol encapsulated in TCP/IP, such as iSCSI (SCSI encapsulated in TCP/IP).

In contrast, the vdisk objects are accessible as files by the NAS (NFS and CIFS) protocols. For a NAS-based network environment, the clients are configured to access information stored on the storage appliance as files.

FIG. 1 is a block diagram of a system (apparatus) 100, in accordance with an embodiment of the invention. The system 100 includes one or more host devices 110, and one or more storage appliances 115. For purposes of clarity, only one host device 110 and one storage appliance 115 are shown in the example of FIG. 1. The host device 110 and storage appliance 115 can communicate via a network 120 which may be, for example, a local area network (LAN), a wide area network (WAN), virtual private network (VPN), a combination of LAN, WAN and VPN implementations, or another suitable communication network. In another embodiment of the invention, all elements or components that are associated with each of the devices 110 and 115 are implemented in a single device such as, for example, the host device 110. For example, the elements in blocks 103-118 in this alternative embodiment would be implemented in the host device 100. In this alternative implementation, the host device 110 is typically implemented as a stand-alone computer.

Each of the devices in the system 100 typically includes an appropriate conventional network interface arrangement (not shown) for communicating over the network 120 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage appliance is a computer that provides file service relating to the organization or storage of information on storage devices, such as, e.g., disks. Examples of currently available storage appliance products and associated software components are commercially available from, for example, NETWORK APPLIANCE, INC., Sunnyvale, Calif. or other vendors. Additional details of an example storage appliance are also disclosed in, for example, commonly-assigned U.S. patent application Ser. No. 10/215,917. In addition, it will be understood to those skilled in the art that the embodiments of the invention described herein may also apply to any type of special-purpose computer (e.g., server) or general-purpose computer, including a stand-alone computer, embodied as a storage appliance or file server. Moreover, the teachings of the embodiments of the invention can also be adapted to a variety of file server architectures including, but not limited to, a network-attached storage environment, or a storage area network and disk assembly directly-attached to a client/host computer. The term "storage appliance" or "file server" or "filer" should therefore be taken broadly to include such arrangements.

The storage appliance 115 includes a processor 103, a non-transitory computer-readable storage medium such as a memory 104, a network adapter 106, and a storage adapter 108 interconnected by a system bus 110. The storage appliance 115 also includes a storage operating system 112 that implements a file system to logically organize the information as a hierarchical structure of directories and files on a storage device (e.g., disk). Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage appliance 115. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage appliance by inter-alia invoking storage operations in support of the file services that are implemented by the storage appliance. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage appliance 115 to a host 110 over the computer network 120 or connecting the storage appliance 115 to other storage appliance(s). A host 110 can be a general-purpose computer configured to execute applications including file system protocols such as, for example, the Network File System (NFS) or the Common Internet File System (CIFS) protocol or other suitable protocols. Moreover, the host 110 can interact with the storage appliance 115 in accordance with the known client/server model of information delivery.

The storage adapter 108 cooperates with the storage operating system 112 in order to access information requested by the host 110. The information may be stored in a number of LUNs in a storage volume (e.g., LUN A, LUN B, and LUN C in volume 0). The number of LUNs in a storage volume may vary. Each storage volume is constructed from an array of storage devices D (e.g., physical disks D) that are typically organized as RAID disk groups. The RAID disk groups include independent physical disks including those storing a striped data and those storing separate parity data. The number of disks in a storage volume and in a RAID disk group may vary.

The storage adapter 108 includes input/output interface circuitry that couples to the storage devices (e.g., disks) over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the host 110.

To facilitate access to the storage devices (e.g., disks), the storage operating system 112 typically implements a file system that logically organizes the information as a hierarchical structure of directories in files on the storage devices. Each file on a storage device (e.g., disk) may be implemented as a set of data blocks configured to store information such as text or other format. The directory may be implemented as a formatted file in which other files and directories are stored. The storage operating system 112 associated with each volume is, for example, the Data ONTAP® storage operating system which is commercially available from NETWORK APPLIANCE, INC. Additional details of an example storage operating system 112 are disclosed in, for example, commonly-assigned U.S. patent application Ser. No. 10/836,090. The Data ONTAP storage operating system implements a Write Anywhere File Layout (WAFL)® file system. However, it is expressly contemplated that the principles of embodiments of this invention can be implemented using a variety of alternate storage operating system architectures.

Figure 2:
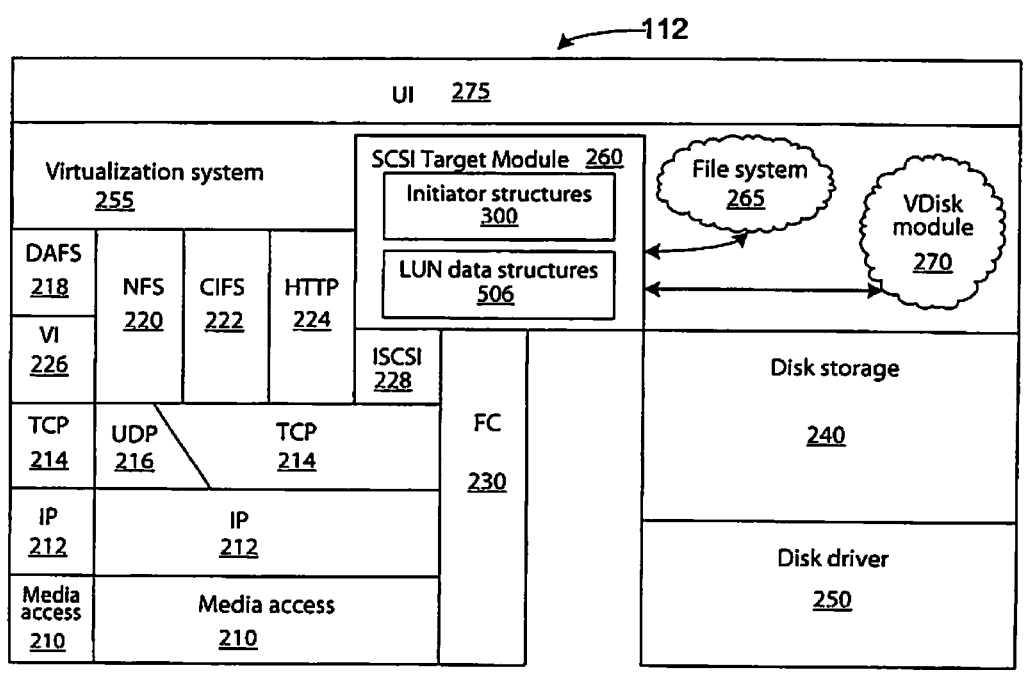
FIG. 2 is a block diagram of an example storage operating system that can be used in an embodiment of the invention.

FIG. 2 is a schematic block diagram of an example storage operating system 112 that may be advantageously used in an embodiment of the invention. The storage operating system 112 includes a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218. An example of the VI layer 226 is implemented in the DATA ONTAP storage operating system.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system 112 includes a storage module embodied as a disk storage system 240 (e.g., RAID system) that manages the storage and retrieval of information to and from the volumes/storage devices in accordance with I/O operations, and a storage device driver system 250 that implements a disk access protocol such as, e.g., the SCSI protocol.

Bridging the disk software layers with the integrated network protocol stack layers in FIG. 2 is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof. The vdisk module 270 interacts with the file system 265 to provide a data path from the block-based SCSI target module 260 to blocks managed by the file system 265. In essence, the vdisk module 270 manages SAN deployments by, among other things, implementing a comprehensive set of vdisk (lun) commands that are converted to primitive file system operations ("primitives") that interact with the file system 265 and the SCSI target module 260 in order to implement the vdisks, as discussed in, for example, commonly-assigned U.S. patent application Ser. No. 10/619,122.

The SCSI target module 260, in turn, initiates emulation of a disk or lun by providing a mapping procedure that translates logical block access to luns specified in access requests into virtual block access to the special vdisk file types and, for responses to the requests, vdisks into luns. The SCSI target module 260 is illustratively disposed between the iSCSI driver 228 and FC driver 230 and the file system 265 to thereby provide a translation layer of the virtualization system 255 between the SAN block (lun) space and the file system space, where luns are represented as vdisks. By disposing SAN virtualization over the file system 265, the storage appliance 115 reverses the approaches taken by prior systems to thereby provide a single unified storage platform for essentially all storage access protocols.

Additionally, the SCSI target module 260 includes a set of initiator data structures 300 and a set of lun data structures 506. The initiator data structure 300 is, in the illustrative embodiment, created when a new initiator (e.g., client) first connects to the storage appliance. Thus, each initiator data structure is associated with a SCSI initiator (i.e., a client of the storage appliance). The storage appliance 115 illustratively populates the various fields with data obtained during the connection stage. The initiator data structure 300 includes various fields including, such as, a world wide name field, an iSCSI name, a SCSI status field, and a lun map. It should be noted that in alternate embodiments the initiator data structure 300 may have varying and/or differing fields from the example fields listed above. Each lun data descriptor object 506 contains various data associated with a given vdisk. This information is used by the storage appliance 115 for management of the given vdisk. These data structures, described further in commonly-assigned U.S. patent application Ser. No. 10/619,122, store various configuration and tracking data utilized by the storage operating system 112 for use with each initiator (client) and lun (vdisk) associated with the storage appliance 115.

The file system 265 is illustratively a message-based system that provides logical volume management capabilities for use in access to the information stored on the storage devices, such as, e.g., disks. In other words, in addition to providing file system semantics, the file system 265 provides functions normally associated with a volume manager. These functions include, for example, (i) aggregation of the disks, (ii) aggregation of storage bandwidth of the disks, and (iii) reliability guarantees, such as mirroring and/or parity (RAID). The file system 265 illustratively implements the WAFL (write-anywhere file system) file system having an on-disk format representation that is block-based using, e.g., 4 kilobyte (kB) blocks and using index nodes ("inodes") to identify files and file attributes (such as creation time, access permissions, size and block location). The file system 265 uses files to store metadata describing the layout of its file system; these metadata files include, among others, an inode file. A file handle, i.e., an identifier that includes an inode number, is used to retrieve an inode from a storage device (e.g., disk).

Broadly stated, all inodes of the write-anywhere file system are organized into the inode file. A file system (FS) info block specifies the layout of information in the file system and includes an inode of a file that includes all other inodes of the file system. Each logical volume has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the host 110 is forwarded as a packet 111 over the computer network 120 and onto the storage appliance 115 where it is received at the network adapter 106. A network driver (of layer 210 or layer 230) processes the packet 111 and, if appropriate, passes it on to a network protocol and file access layer for additional processing prior to forwarding to the file system 265. Here, the file system 265 generates operations to load (retrieve) the requested data from a storage device (e.g., disk) if it is not resident "in core", i.e., in the buffer cache 105. If the information is not in the cache, the file system 265 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified storage device D (e.g., disk D) and loads the requested data block(s) in buffer cache 170 for processing by the storage appliance. Upon completion of the request, the storage appliance (and operating system) returns a reply to the host 110 over the network 120.

It should be noted that the software "path" through the storage operating system layers described above needed to perform data storage access for the host request 111 received at the storage appliance may alternatively be implemented in hardware. In other words, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage appliance 115 in response to a request issued by a host 110. Moreover, in another alternate embodiment of the invention, the processing elements of adapters 106, 108 may be configured to offload some or all of the packet processing and storage access operations, respectively, from processor 103, to thereby increase the performance of the storage service provided by the storage appliance 115. It is expressly contemplated that the various processes, architectures and procedures described herein can be implemented in hardware, firmware or software.

As used herein, the term "storage operating system" generally refers to the computer-executable code operable to perform a storage function in a storage appliance, e.g., that manages data access and may, in the case of a file server, implement file system semantics. In this sense, the Data ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage appliance 115. An example of a multi-protocol storage appliance that may be advantageously used with the present invention is described in commonly-assigned U.S. patent application Ser. No. 10/215,917. Moreover, the teachings of this invention can be adapted to a variety of storage appliance architectures or storage system architectures including, but not limited to, a network-attached storage environment, a storage area network and disk assembly directly-attached to a client or host computer. The term "storage appliance" or "storage system" should therefore be taken broadly to include such arrangements in addition to any subsystems configured to perform a storage function and associated with other equipment or systems.

Figure 3:
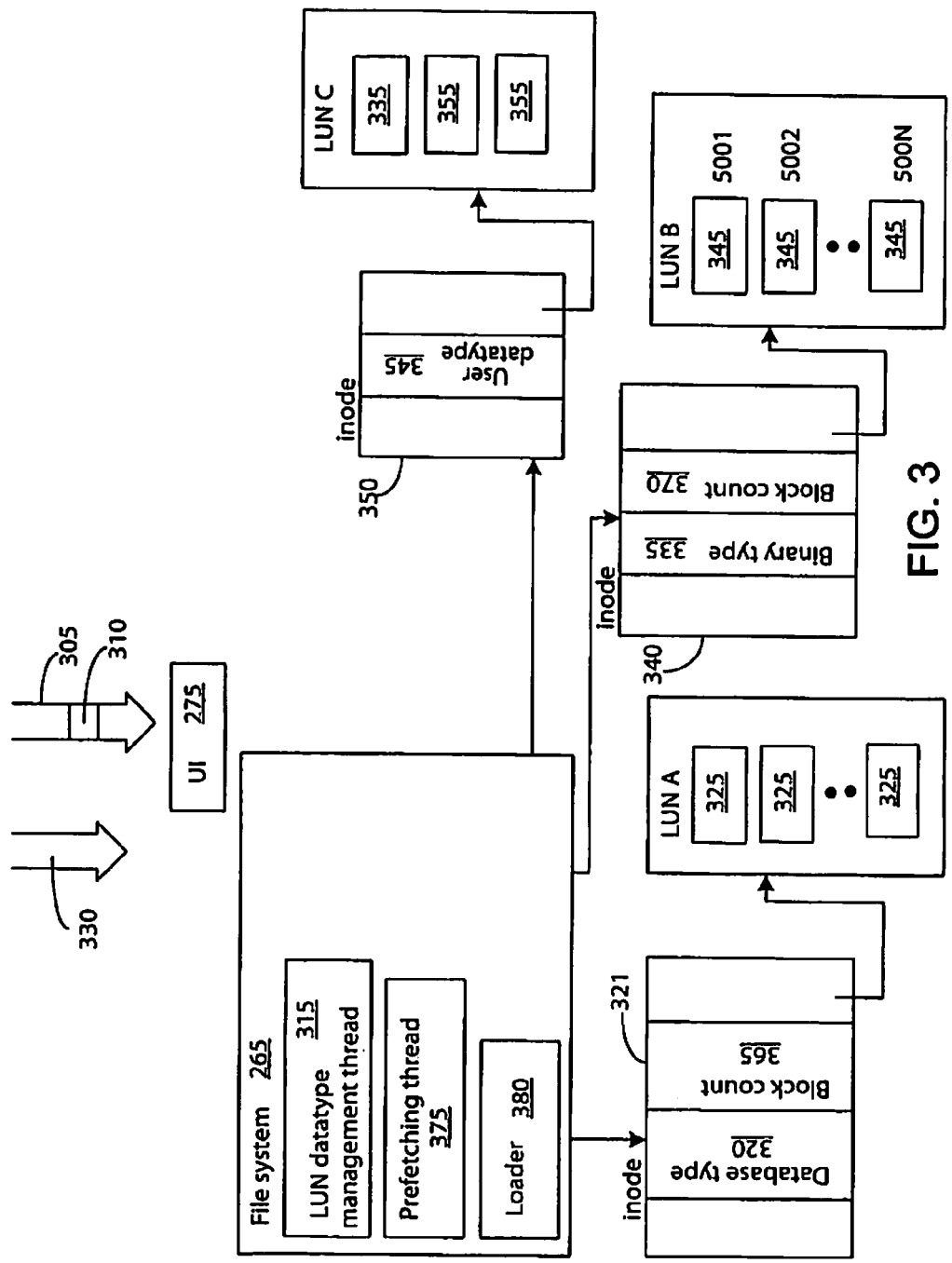
FIG. 3 is a block diagram that illustrates additional details of an embodiment of the invention.

FIG. 3 is a block diagram that illustrates additional details of an embodiment of the invention. A LUN is typically created on a storage appliance 115 (e.g., a filer) by using an application interface such as, for example the zephyr API (ZAPI) which is an application interface that is provided by Network Appliance Incorporated, or by directly accessing the storage appliance 115 via a command line interface (CLI). During creation of the LUN, a server administrator can specify the path (i.e., pathname) and size of the LUN. The LUN path describes a path to the storage volume with the file that contains the LUN. Additional details on creating a LUN are disclosed in, for example, commonly-owned U.S. patent application Ser. No. 11/187,729.

Additionally, the server administrator can specify the data type for the lun (also referred herein as "LUN type" or "LUN data type"). An example LUN command 305 that the server administrator can input into the user interface 275 for creating a LUN is shown below, which indicates the LUN path (Nol/volO/lun0), LUN size (1 gigabyte) and the LUN data type (database type):

Storageappliance>lun create-s 1G-t solaris-luntype database /vol/vol0/lun0.

However, it is within the scope of embodiments of the invention to use other command formats that may differ depending on the file system that is used in the storage appliance 115. Although embodiments of the invention can be used in a WAFL file system, embodiments of the invention can also be used in any general disk scenario that does not use the WAFL file system.

The storage operating system 112 would then route the LUN creation command 305 to the file system 265. This command 305 contains the LUN data type 310.

The different data types that are stored in a LUN have different resource requirements for the storage appliance. For example, the database-type data files are large-size files and would require a large amount of memory buffers in the storage appliance for buffering these file types before these file types are stored in the disks that are used by a LUN. On the other hand, user-type data files would require comparatively much less memory buffers in the storage appliance as compared to the database-type data files, due to the smaller data sizes of the user-type data files. However, current technology categorizes and processes all write data to be stored (written) in a LUN in uniform manner regardless of the data type in the LUN, and do not specify the data type for the data to be stored in a LUN. As discussed below, an embodiment of the invention advantageously will use the data type in a LUN in order to improve the performance for I/O (input/output) requests from hosts to storage appliances and to improve the manageability of LUNs.

A LUN data type management software thread (LUN data type management module) 315 in the file system 265 would then decide on a data block allocation policy for the LUN, based on the LUN data type (e.g., database, binary, or user), as discussed below. Examples of various LUN data types are described in detail below with reference to FIG. 4. The various threads that are discussed herein (e.g., threads 315, 375, 380, 505, 560) can be implemented as, for example, instructions that are based on known programming languages (e.g., C, C++, etc.) and that are programmed by use of, for example, standard programming techniques.

As an example, the server administrator can specify the LUN data type (i.e., LUN type) for LUN A as a "database" data type. The database LUN data type, is specified in a field 320 in an inode file 321, in response to the command 305. In current inodes in a WAFL system, this field 320 is a spare field that can store the bit values that indicate the LUN data type for a LUN. The inode 321 is the above-discussed special file inode that holds (or points to) data and at least one associated stream inode that holds attributes such as security information for a vdisk object which is identified by SAN clients as a LUN. As an example, the spare field 320 is one byte in size, and the bit values in the spare field 320 can correspond to a particular LUN data type. With one byte, up to 256 different LUN data types can be specified by the bit values in the one byte. By using this field 320 to store the LUN data type information, the existing inode data structure will advantageously not require data structure changes. However, it is within the scope of embodiments of the invention to store the LUN data type information in other data structures that can be accessed and read by the file system 265. Since a database LUN data type is comparatively large in data size as compared to other LUN data types, a large number of data blocks are typically required to be pre-allocated for LUN A. The data blocks are storage spaces in the storage devices D (e.g., disks D) of system 100 (FIG. 1). Each data block may have a size of, for example, 4 kilobytes. The file system 265 will allocate the data blocks 325 for LUN A by use of, for example, the WAFL data block allocation methods as described in, for example, commonly-assigned U.S. patent application Ser. No. 10/836,090. The data blocks 325 can point to other data blocks 325, which is a feature of the WAFL system. The storage adapter 108 (FIG. 1) can then store (into the blocks 325 of LUN A) the data for a database data 330 that is received by the file system 265. Since the access by the file system 265 for a database data type is generally index based (i.e., data access is performed by first accessing the index node 321), it is not required that the data blocks 325 are contiguous blocks in a storage device (e.g., disk D).

The file system 265 can increase the LUN A size by allocating additional data blocks 325 (reserved blocks) to the LUN A. Allocation of additional data blocks (reserved blocks) to a LUN is also described in the above-referenced commonly-assigned U.S. patent application Ser. No. 10/836,090. Since the data size in database data type (e.g., email files) can increase, the number of additional data blocks to be allocated to the LUN A can be relatively larger in total size (e.g., megabytes to terabytes range) based on the database LUN data type. The administrator can set the number of additional data blocks to be allocated to the LUN A by setting the block count field 365 in the inode 321.

As another example, assume that LUN B will store a LUN data type that is binary, as indicated by field 335 of inode 340. As discussed below with reference to FIG. 4, a binary data type is executable data, does not change in size, and is usually not more than a few megabytes in size. Because of the comparatively smaller size of a binary data type as compared to a database data type, the file system 265 will allocate the data blocks 345 which will be contiguous data blocks in a storage device D (e.g., disk D) and will not be required to reserve extra data blocks in the LUN B for storing the binary data type. The file system 265 allocates contiguous blocks based on the block numbers of the data blocks. For example, since the data blocks 345 have the block numbers 5001, 5002, . . . 500N, which are subsequent block number values, the data blocks 345 are contiguous to each other.

As another example, assume that LUN C will store a LUN data type that is user data, as indicated by field 345 of inode

350. As discussed below with reference to FIG. 4, a user data type is comparatively small in size (e.g., in the kilobytes to megabytes size range) as compared to a database data type. Because of the comparatively smaller size of a user data type, the file system 265 will allocate the data blocks 355 which will be contiguous data blocks in a storage device D (e.g., disk D).

Since the data size of a user data type (e.g., Word documents created by a user) can increase, the number of additional data blocks (reserved blocks) to be allocated to the LUN C can be relatively smaller in total size (e.g., kilobytes to megabytes range), as set by the administrator in the block count field 370 in the inode 350.

Therefore, by specifying the LUN data type for a LUN, the file system 265 can allocate data blocks for the LUN in a more intelligent manner, by allocating a larger number of data blocks for a database data types to be written into a LUN and by allocating contiguous data blocks for binary data types to be written to a LUN and user data types to be written to a LUN. By allocating a larger number of data blocks for database data types, the performance of the storage appliance 115 improves because sufficient storage space will be available for the larger data sizes of the database data type. By allocating contiguous data blocks for binary data types and user data types, the performance of the storage appliance 115 improves because read operations will increase in speed when reading a binary data type or a user data type because of the contiguous locations of the data blocks. A standard data prefetching software thread (prefetching module) 375 may be performed by the file system 265 to prefetch the user data types or binary data types in the contiguous data blocks. Prefetching involves the file system 265 in accessing the adjacent contiguous data blocks at the same time or concurrently, in order to read or write the data to those contiguous data blocks. Details of data prefetching methods are well known to those skilled in the art. The prefetching operations by the prefetching software thread 375 results in increased speed in the read operations to the contiguous data blocks.

FIG. 4 is a table diagram 400 that summarizes various characteristics of different data types that can be stored in a LUN as used in an embodiment of the invention. Examples data files for a binary data type 405 include, but are not limited to, audio data, video data, CD (compact disk) images, and executable files (programs). A loader software thread (loader module) 380 (FIG. 3) in the file system 265 will load the binary-type data file is a sequential manner, into the contiguous blocks 345 (FIG. 3). The file system 265 will load the binary-type data file as a whole and not in data chunks and is therefore written into the contiguous data blocks 345. Typically, the binary-type data files are in the megabytes size range. Binary-type data is fixed size and does not change in size.

A data file for a database data type 410 include but are not limited to, for example, email files or database data in commercially available databases from, for example, Oracle Corporation or Sybase Corporation. The database-type files are much larger in size as compared to the binary-type data files or user-type data files, and the properties of the database-type files may change depending upon the application. For example, if the database-type file is related to online transactions (e.g., email files), then the size of the database can change due to the input data from a user who is engaged in the online transaction. On the other hand, if the database-type file is a read-only data that is stored by a database application, then the size of the file will be typically fixed and will typically not change.

Typically, the loader software thread 380 in the file system 265 will not allocate the database-type file in continuous data blocks but are instead stored in non-contiguous data blocks 325. For example, the data blocks 325 are not contiguous because they are stored between multiple storage devices D (e.g., disks D). The file system 265 can access the multiple storage devices (e.g., disks) in parallel for faster speed.

Examples of data files for user data type 415 include, but are not limited to, for example, user-created documents such as Microsoft Word files or Powerpoint files or program files such as C or C++ files. The user data type file is comparatively small as compared to database-type files and does not undergo a large amount of changes as compared to some database-type files because a user is typically required to manually initiate a change to a user-type file.

User-type data is accessed sequentially by a user and contiguous data blocks are allocated for the user-type data. The size of the user-type data is typically in the kilobytes to megabytes range.

Other characteristics for the different data types 405-415 are shown in Table 400 of FIG. 4.

The table 400 can be a data structure that is read by the file system 265, in order to determine the proper data block allocation for a LUN.

An embodiment of the invention can also store other data types 420 in a LUN. For example, if this other data type 420 is small in size, then this data type can be stored in contiguous data blocks in a LUN.\

Figure 5:
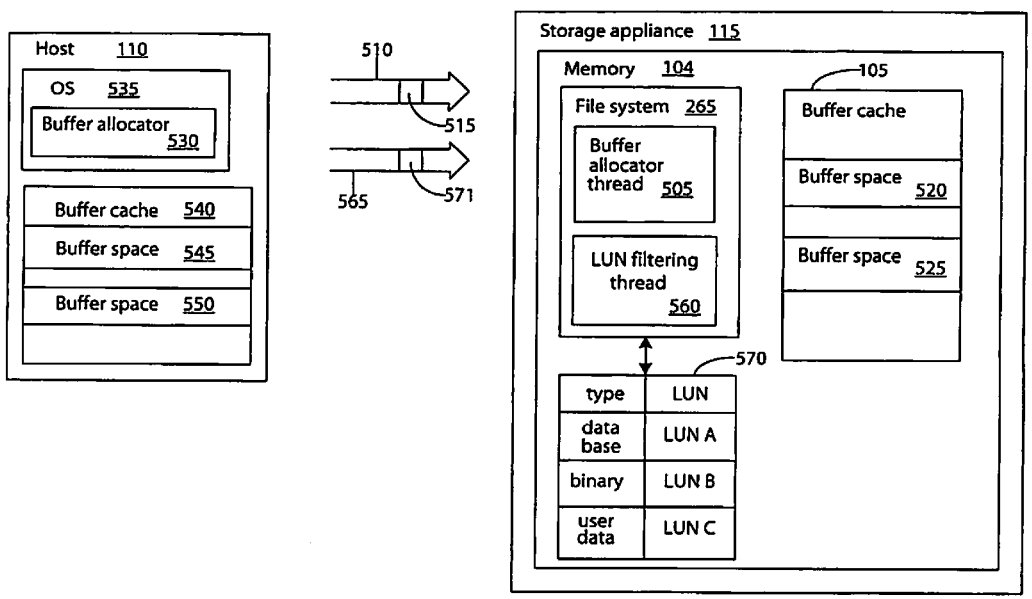
FIG. 5 is a block diagram that illustrates additional details of an embodiment of the invention.

FIG. 5 is a block diagram that illustrates additional details of an embodiment of the invention. The file system 180 can optionally include a buffer allocator software thread (allocator module) 505 that allocates buffer space in the buffer cache 105. The buffer allocator thread 505 reserves buffer space(s) in the buffer cache 105 by use of standard methods for reserving buffer spaces in a buffer. When the host 110 sends a write data 510 to the storage appliance 115, so that the write data 510 is written to the storage device (e.g., disks) of the storage appliance 115, the buffer allocator thread 505 checks the LUN data type attributes 515 of the write data 510. The attributes 515 indicates if the write data is a binary data type 405, database data type 410, user data type 415, or other LUN data type 420. If the write data 510 is a database data type 410, then the buffer allocator thread 505 will buffer the write data 410 in a buffer space 520 prior to the loader 380 in writing the write data 510 to the LUN A. Since the buffer space 520 will buffer the larger sized database data type, the buffer space 520 is comparatively larger in size as compared another buffer space 525. Since the attributes 515 of the write data matches the LUN data type 320 (database type) of LUN A, the file system allocates data blocks in LUN A for the write data and also writes (by use of loader 380) the write data into LUN A.

As another example, if the write data 510 is a binary data type 405 or a user data type 415, then the buffer allocator thread 505 will buffer the write data 410 in a buffer space 525 prior to the loader 380 in writing the write data 510 to the LUN B (in the case of a binary data type 405) or to LUN C (in the case of a user data type 415). Since the buffer space 525 will buffer the smaller sized binary data type or user data type, the buffer space 525 is comparatively smaller in size as compared to the buffer space 520.

In reading data from a LUN, the prefetching thread 375 (FIG. 3) can prefetch the binary data type 405 from LUN B or user data type 415 from LUN C. The buffer allocator thread 505 can then buffer the prefetched binary data type or user data type into the buffer space 525 and then send those read data to the requesting host 110.

The host 110 can also implement a buffer allocator thread 530 in the host operating system 535, where the buffer allocator 530 performs the buffer space allocation in the host buffer cache 540. The database data type from the LUN A or the binary data type or user data type from LUNs B and C, respectively, are buffered in the buffer spaces 545 and 550, respectively. Since an appropriate buffer size in the host 110 will buffer the database data type or binary or user data types, data throughput in the host 110 is improved due to the caching of data.

As another option in another embodiment of the invention, a LUN filtering software thread (filtering module) 560 (which can be part of the loader module 380 in the file system 265) can control the access of the host 110 to a LUN depending on the LUN data type. For example, assume that the host 110 sends a request 565 (read or write request) to the storage appliance 115. The user of host 110 has requested a particular data type as indicated in the LUN data type attributes 571 of the request 565. The LUN filtering thread 560 checks the attributes 571 and the mapping table 570, in order to determine the LUN data type that is requested by and that should be returned to the user of host 110. For example, if the attributes 571 indicates the database LUN data type, then based on table 570, the LUN filtering engine thread 560 will permit access by the host 110 for read or write operations to the LUN A. Similarly, table 570 indicates that binary LUN data type is stored in the LUN B and user data type is stored in LUN C. This table 570 is created or modified by the file system 265 when a LUN is created and assigned with a LUN data type, as discussed above. Based on the LUN indicated in table 570 for a particular LUN data type, the LUN filtering thread 560 will route the access request 565 from the host 110 to the appropriate LUN, via the appropriate inode. In other words, the LUN filtering thread determines the appropriate LUN(s) in the table 570. The file system 265 will then access the inode of the appropriate LUN in response to the access request 565. By accessing the inode of the appropriate LUN, the file system 265 can respond to the access request 565.

As another example, if the user of host 110 does not specify a particular LUN data type in the attributes 571, then the filtering engine thread 560 will permit the user to access each of the LUNs A, B, and C.

As another example, if an application (e.g., OS 535) that is accessing a LUN or LUNS provides improper information about the LUN-type (via attributes 571) or do not provide information about the LUN-type, then the filtering engine thread 560 will block the access request 565 to the LUN or LUNs by the requesting application. An example of improper information about the LUN-type is when the attributes 571 indicate a LUN data type that is not present in the LUNs or when the attributes 571 indicate a LUN data type that does not match the LUN data type of a particular LUN to be accessed by the access request 571.

Figure 6:
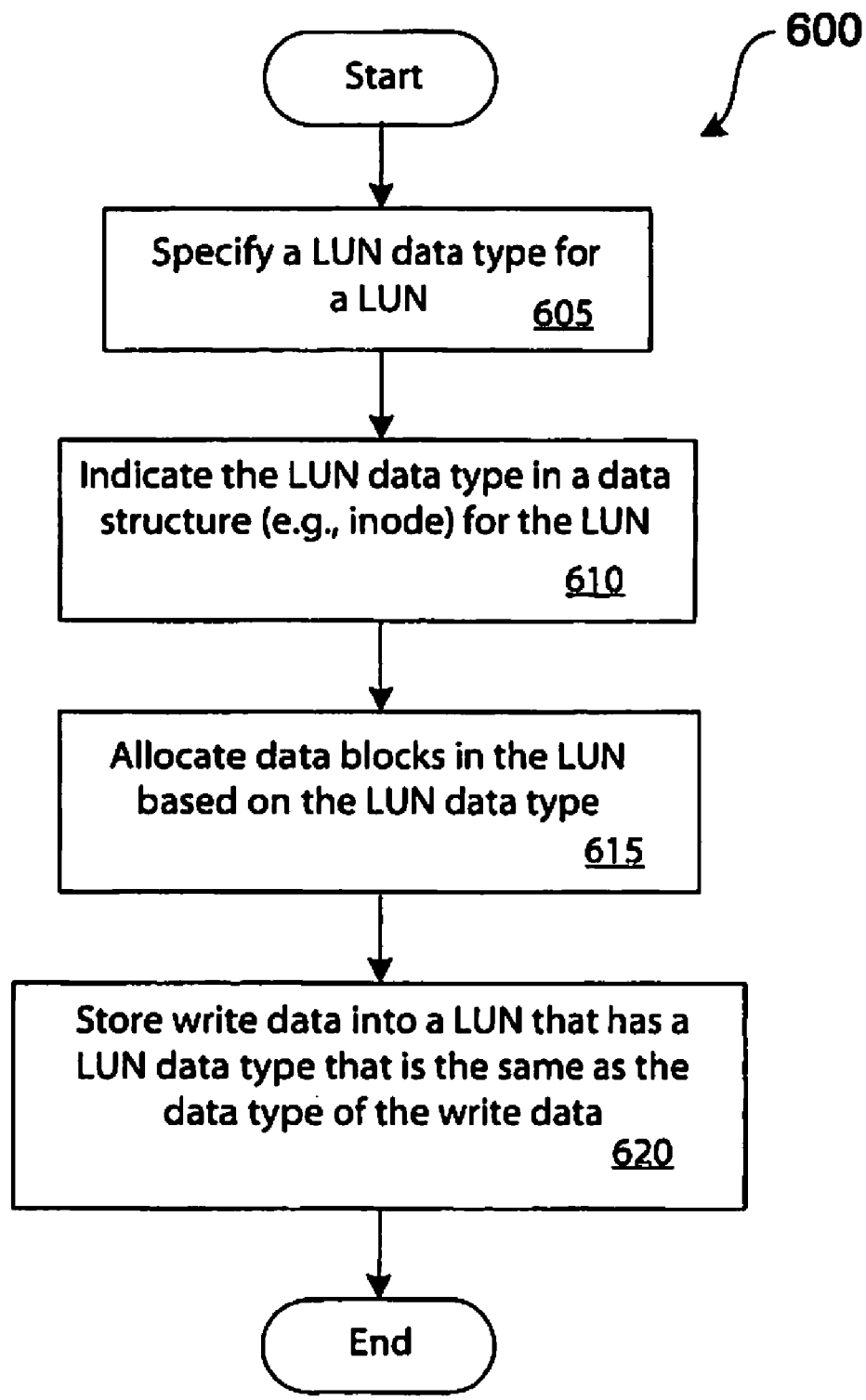
FIG. 6 is a flow diagram that illustrates a method in accordance with an embodiment of the invention.

FIG. 6 is a flow diagram of a method 600 in accordance with an embodiment of the invention. In block 605, a server administrator specifies a LUN data type (e.g., binary data type, database data type, or user data type) for a LUN. The server administrator can specify the LUN data type via command 305 (FIG. 3) by use of user interface 275.

In block 610, the LUN data type management software thread 315 will indicate the LUN data type in a data structure (e.g., inode) for the LUN.

In block 615, based on the LUN data type, the file system 265 will allocate the data blocks for the LUN. The file system 265 can use standard WAFL block allocation methods to allocate the data blocks to the LUN.

In block 620, the loader software thread 380 of the file system 265 will store a write data into a LUN that has a LUN data type that is the same as the data type of the write data. For example, if the write data is a database data type, then the write data is stored in the non-contiguous data blocks 325 (FIG. 3) of LUN A which is a database LUN data type. As another example, if the write data is a binary data type, then the write data is stored in the contiguous data blocks 345 (FIG. 3) of LUN B which is a binary LUN data type. As another example, if the write data is a user data type, then the write data is stored in the contiguous data blocks 355 (FIG. 3) of LUN C which is a user data LUN type.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
specifying, in a network storage system, a logical unit number (LUN) data type for a LUN;
receiving, at the network storage system, write data associated with a request directed to the LUN, the write data having a LUN data type attribute;
determining, by the network storage system, whether the LUN data type attribute of the write data corresponds to the LUN data type of the LUN; and
if the LUN data type attribute of the write data is determined to correspond to the LUN data type of the LUN, then allocating, by the network storage system, at least some data blocks in the LUN for the write data, and otherwise, denying the request access to the LUN;
determining a number of data blocks to be allocated in the LUN, based on the LUN data type, wherein a first number of blocks are allocated in the LUN when the LUN data type is a first type and a second number of data blocks are allocated in the LUN when the data type is a second type.

2. The method as recited in claim 1, wherein the LUN data type comprises one of: a binary data type, a database data type or a user data type.

3. The method as recited in claim 1, further comprising:
specifying the LUN data type for the LUN by setting a value in a data structure for the LUN.

4. The method as recited in claim 3, wherein the data structure comprises an index node (inode) for the LUN.

5. The method as recited in claim 1, further comprising:
allocating the data blocks in the LUN as contiguous data blocks or as non-contiguous data blocks based on the LUN data type.

6. The method as recited in claim 1, further comprising:
  storing data into the LUN only if the write data has a LUN data type attribute that matches the LUN data type of the LUN.

7. The method as recited in claim 1, further comprising:
  allocating buffer space based on the LUN data type.

8. The method as recited in claim 1, further comprising:
  filtering an access request directed to the LUN based on a LUN data type attribute indicated in the access request.

9. A non-transitory machine-readable storage medium having stored thereon code which, when executed by a machine, cause the machine to perform operations comprising:
  specifying a logical unit number (LUN) data type for a LUN;
  determining a number of data blocks to be allocated in the LUN, based on the LUN data type, wherein a first number of blocks are allocated in the LUN when the LUN data type is a first type and a second number of data blocks are allocated in the LUN when the data type is a second type;
  receiving write data to be written into the LUN, the write data having a LUN data type attribute;
  comparing the LUN data type attribute of the write data with the LUN data type of the LUN; and if the LUN data type attribute of the write data matches the LUN data type of the LUN, allocating at least some data blocks in the LUN for the write data and writing the write data into the LUN.

10. The non-transitory machine-readable storage medium as recited in claim 9, wherein the LUN data type comprises one of: a binary data type, a database data type or a user data type.

11. The non-transitory machine-readable storage medium as recited in claim 9, said operations further comprising:
  specifying the LUN data type for the LUN by setting a value in a data structure for the LUN.

12. The non-transitory machine-readable storage medium as recited in claim 11, wherein the data structure comprises an index node (inode) for the LUN.

13. The non-transitory machine-readable storage medium as recited in claim 9, said operations further comprising:
  allocating the data blocks in the LUN as contiguous data blocks or as non-contiguous data blocks based on the LUN data type.

14. The non-transitory machine-readable storage medium as recited in claim 9, said operations further comprising:
  storing data into the LUN only when the write data has a LUN data type attribute that matches the LUN data type of the LUN.

15. The non-transitory machine-readable storage medium as recited in claim 9, said operations further comprising:
  allocating buffer space based on the LUN data type.

16. The non-transitory machine-readable storage medium as recited in claim 9, said operations further comprising:
  filtering an access request directed to the LUN based on a LUN data type attribute indicated in the access request.

17. A processing system comprising:
  a processor; and
  a file system accessible to the processor and configured to:
    specify a logical unit number (LUN) data type for a LUN;
    determine whether to allocate data blocks in the LUN as contiguous data blocks or as non-contiguous data blocks, based on the LUN data type;
    receive write data to be written into the LUN, the write data having a LUN data type attribute;
    compare the LUN data type attribute of the write data with the LUN data type of the LUN;
    if the LUN data type attribute of the write data matches the LUN data type of the LUN, allocate at least some data blocks in the LUN for the write data and write the write data into the LUN;
    determine a number of data blocks to be allocated in the LUN, based on the LUN data type, wherein a first number of blocks are allocated in the LUN when the LUN data type is a first type and a second number of data blocks are allocated in the LUN when the data type is a second type.

18. The processing system as recited in claim 17, wherein the LUN data type comprises one of: a binary data type, a database data type or a user data type.

19. The processing system as recited in claim 17, wherein the processor is further configured to specify the LUN data type for the LUN by setting a value in a data structure for the LUN.

20. The processing system as recited in claim 19, wherein the data structure comprises an index node (inode) for the LUN.

21. The processing system as recited in claim 17, wherein the processor is further configured to store data into the LUN only when the write data has a LUN data type attribute that matches the LUN data type of the LUN.

22. The processing system as recited in claim 17, wherein the processor is further configured to allocate buffer space based on the LUN data type.

23. The processing system as recited in claim 17, wherein the processor is further configured to filter an access request based on the LUN data type attribute indicated in the access request.

* * * * *

UNITED STATES PATENT AND TRADEMARK OFFICE
CERTIFICATE OF CORRECTION

PATENT NO. : 8,086,603 B2  
APPLICATION NO. : 13/022470  
DATED : December 27, 2011  
INVENTOR(S) : Rupesh Nasre et al.

It is certified that error appears in the above-identified patent and that said Letters Patent is hereby corrected as shown below:

On the Title Page, Item (30) under Foreign Application Priority Data, add
-- Dec. 19, 2007 (IN) ..................... 3058/CHE/2007 --.

Signed and Sealed this  
Twenty-ninth Day of January, 2013

David J. Kappos  
*Director of the United States Patent and Trademark Office*